United States Patent
Juenger

(10) Patent No.: US 7,539,809 B2
(45) Date of Patent: May 26, 2009

(54) SYSTEM AND METHOD FOR DYNAMIC ADJUSTMENT OF AN INFORMATION HANDLING SYSTEMS GRAPHICS BUS

(75) Inventor: Randall E. Juenger, Belton, TX (US)

(73) Assignee: Dell Products L.P., Round Rock, TX (US)

( * ) Notice: Subject to any disclaimer, the term of this patent is extended or adjusted under 35 U.S.C. 154(b) by 280 days.

(21) Appl. No.: 11/207,298

(22) Filed: Aug. 19, 2005

(65) Prior Publication Data

US 2007/0067548 A1  Mar. 22, 2007

(51) Int. Cl.
  *G06F 13/40* (2006.01)
(52) U.S. Cl. .................... 710/307; 710/309; 370/465
(58) Field of Classification Search ............... 710/301, 710/307, 309; 370/465
  See application file for complete search history.

(56) References Cited

U.S. PATENT DOCUMENTS

| | | | | |
|---|---|---|---|---|
| 5,673,253 | A * | 9/1997 | Shaffer ...................... 370/229 |
| 6,442,628 | B1 * | 8/2002 | Bastiani et al. ............... 710/60 |
| 6,535,939 | B1 * | 3/2003 | Arimilli et al. .............. 710/116 |
| 6,581,115 | B1 * | 6/2003 | Arimilli et al. .............. 710/107 |
| 6,665,742 | B2 * | 12/2003 | Owen et al. .................... 710/10 |
| 7,099,969 | B2 * | 8/2006 | McAfee et al. ............... 710/107 |
| 7,136,953 | B1 * | 11/2006 | Bisson et al. ................ 710/307 |
| 7,174,411 | B1 * | 2/2007 | Ngai .......................... 710/316 |
| 7,245,635 | B2 * | 7/2007 | Mo et al. ..................... 370/468 |
| 7,293,125 | B2 * | 11/2007 | McAfee et al. .............. 710/107 |

(Continued)

OTHER PUBLICATIONS

PCI-SIG. PCI Express Base Specification Revision 1.0. Apr. 29, 2002. pp. 30-32.*

(Continued)

*Primary Examiner*—Mark Rinehart
*Assistant Examiner*—Matthew D Spittle
(74) *Attorney, Agent, or Firm*—Hamilton & Terrile, LLP; Robert W. Holland

(57) ABSTRACT

PCI Express bus utilization is monitored for one or more predetermined thresholds to adjust the width of the bus in accordance with the utilization to provide power savings with minimal impact on performance. For instance, a performance monitor of a graphics controller tracks bus utilization with registers to adjust bus width between one, eight and sixteen lanes. Reduced numbers of active lanes are used at low utilization, such as one lane when a desktop graphic is presented on the display, increased numbers of active lanes are used at moderate utilization, such as eight lanes when a video image is presented on the display, and all lanes are active at high utilization, such as for presentation of three dimensional images.

20 Claims, 2 Drawing Sheets

U.S. PATENT DOCUMENTS

| | | | |
|---|---|---|---|
| 2004/0088469 A1* | 5/2004 | Levy | 710/316 |
| 2005/0088445 A1* | 4/2005 | Gonzalez et al. | 345/502 |
| 2005/0160212 A1* | 7/2005 | Caruk | 710/301 |
| 2005/0190536 A1 | 9/2005 | Anderson et al. | 361/686 |
| 2005/0228932 A1* | 10/2005 | Chen et al. | 710/307 |
| 2005/0240703 A1* | 10/2005 | Nguyen et al. | 710/301 |
| 2005/0270298 A1 | 12/2005 | Thieret | 345/502 |
| 2006/0034295 A1* | 2/2006 | Cherukuri et al. | 370/395.52 |
| 2006/0098020 A1* | 5/2006 | Shen et al. | 345/520 |
| 2006/0161714 A1* | 7/2006 | Sue | 710/309 |
| 2006/0168377 A1* | 7/2006 | Vasudevan et al. | 710/104 |
| 2006/0239271 A1* | 10/2006 | Khasnabish et al. | 370/395.21 |
| 2006/0294406 A1* | 12/2006 | Cline | 713/320 |
| 2007/0038794 A1* | 2/2007 | Purcell et al. | 710/306 |
| 2007/0276981 A1* | 11/2007 | Atherton et al. | 710/307 |

OTHER PUBLICATIONS

Pericom Semiconductor Corp. PCI-Express Gen-2 Signal Switch Products. New Product Bulletin. Apr. 9, 2007.*

Ngai, Henry. Lane Routing in PCI Express. Embedded Computing Design Annual Product Directory. Sep. 2005.*

Mammen, Neil. New PCI Express Solution Simplifies Video Security Applications. I/O magazine. Jan. 2006.*

* cited by examiner

SYSTEM AND METHOD FOR DYNAMIC ADJUSTMENT OF AN INFORMATION HANDLING SYSTEMS GRAPHICS BUS

BACKGROUND OF THE INVENTION

1. Field of the Invention

The present invention relates in general to the field of information handling system bus communication, and more particularly to a system and method for dynamic adjustment of an information handling system graphics bus.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems present visual information as images by communicating the visual information to a display having evenly distributed pixels. Typically, a graphics controller converts digital visual information generated by processing components of the information handling system the LVDS format to indicate the color of each pixel in the display. Images on a display are maintained by periodically refreshing the pixels with new or the same color, typically in a scan pattern. Image quality varies in resolution, generally measured by the number of pixels in a display, and the clarity with which movement is depicted. Displays that have greater numbers of pixels will present the visual information with better resolution, however, increased resolution means increased amounts of visual information for communication to the pixels. Similarly, graphics controllers that have more powerful processing capability will present moving images with greater clarity, however, the presentation of moving images with high clarity tends to require communication of relatively large amounts of information. As an example, communication of a typical operating system desktop image uses a relatively small bandwidth of approximately 250 KB/s. In contrast, communication of high bit rate video streaming with a video decode acceleration graphics subsystem uses a bandwidth of approximately 1 GB/s and a three dimensional application with a high resolution display and anti-aliasing uses bandwidth of approximately 2 GB/s.

In order to handle the increased amounts of visual information communicated in support of high resolution displays, industry has turned to PCI Express compatible buses. PCI Express has a 16 lane width for rapidly communicating high volumes of information. However, power consumption and thermal output is substantial during operation of the full 16 lanes of width. In particular, portable information handling systems that run on internal battery power of limited duration and that have small housings with tight thermal constraints have difficulty incorporating a PCI Express bus. To reduce the impact of PCI Express power consumption and thermal output on portable information handling systems, a PCI Express bus is sometimes transitioned from 16 lane width to one lane width when the portable information handling system transitions from external to internal power or when manually overridden by a user interface. One problem that arises with the transition of the PCI express bus to a single lane width while operating on internal battery power is that system performance can degrade, such as by dropping frames of information that exceed the bus single lane width's ability to carry information, resulting in a poor user experience. If a user attempts to correct the degraded performance by increasing the bus width, the user will experience decreased battery run time.

SUMMARY OF THE INVENTION

Therefore a need has arisen for a system and method which balances bandwidth needs and power constraints for communicating information across a variable width bus.

In accordance with the present invention, a system and method are provided which substantially reduce the disadvantages and problems associated with previous methods and systems for balancing bandwidth needs and power constraints for communicating information. Bus utilization of a bus having plural lanes of width is monitored and compared with predetermined thresholds. If a threshold is crossed, the bus is reconfigured from the current number of lanes to a number of lanes associated with the threshold.

More specifically, an information handling system communicates visual information from processing components to a graphics controller across a PCI Express bus having a width of sixteen lanes. A performance monitor monitors the utilization of the bus, such as with performance registers residing on the graphics controller. Upon detection of a predetermined threshold of bus utilization by the performance registers, an interrupt module interrupts communication of information across the bus to retrain for a configuration having a number of lanes associated with the threshold and then continues communication at the new configuration. The performance monitor dynamically adjusts bus width as bus utilization shifts with thresholds that reduce power consumption without display performance degradation. In one embodiment, dynamic bus adjustments occur while operating on internal power, such as a battery, and are disabled during operation on external power. In another alternative embodiment, an application interface detects initiation of one or more predetermined applications and configures the bus to have predetermined numbers of lanes associated with an expected bandwidth demand of the application.

The present invention provides a number of important technical advantages. One example of an important technical advantage is that PCI Express bus lane width is automatically adjusted to accommodate bandwidth needs without excess power consumption. Thus, degradation of system performance is avoided, such as degraded video or three dimensional displays, and battery power life enhanced. Automated monitoring of applications running on the system to initiate lane width adjustments ensures that such adjustments are effectively invisible to the user. Automated monitoring of bus activity levels reduces the risk that bandwidth demands will exceed available bandwidth in a reduced power mode.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Dynamic adjustment of PCI Express bus width reduces information handling system power consumption with minimal impact on information handling system performance by using varying numbers of bus lanes in response to varying bus utilization. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
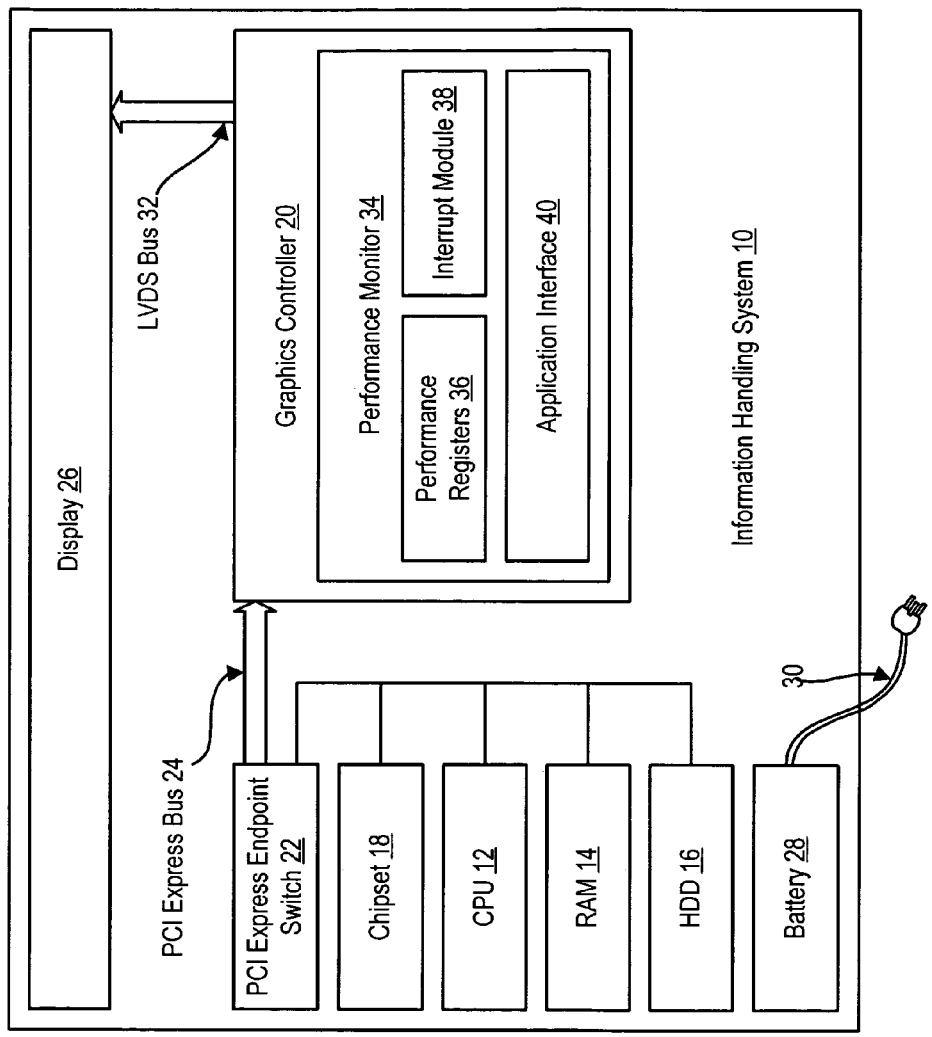
FIG. 1 depicts a block diagram of an information handling system having PCI Express bus dynamic lane width adjustment.

Referring now to FIG. 1, a block diagram depicts an information handling system 10 having PCI Express bus dynamic lane width adjustment. Information handling system 10 is built from plural processing components, including a CPU 12, RAM 14, hard disk drive 16, chipset 18, graphics controller 20, a PCI Express endpoint switch 22 and a PCI Express bus 24. The processing components cooperate to generate visual information for presentation at a display 26, such as a flat panel LCD. The depicted information handling system is configured as a portable system having an integrated display 26, an internal battery 28 and an external power source 30, although alternate embodiments may have various configurations of the processing components and a desktop or other build. Visual information is generated in digital form by applications running on CPU 12 and communicated over PCI Express bus 24 to graphics controller 20. Graphics controller 20 converts the digital information to signals usable by display 26, such as for communication through a LVDS bus 22. Communication of a typical operating system desktop graphic across PCI Express bus 24 uses approximately 250 KB/s, communication of a typical video image with accelerated graphics across PCI Express bus 24 uses approximately 1 GB/s, and communication of a typical three dimensional graphic with anti-aliasing across PCI Express bus 24 uses approximately 2 GB/s. PCI Express bus 24 includes sixteen lanes that communicate the information under management of PCI Express endpoint switch 22, the bus controller.

A performance monitor 34 resides on graphics controller 20 and interfaces with PCI Express endpoint switch 22 to efficiently communicate visual information across PCI Express bus 24 with reduced power consumption. Performance registers 36 track traffic across PCI Express bus 24 to determine the utilization of bandwidth across the bus. As bus utilization substantially reaches predetermined thresholds, interrupt module 38 interrupts traffic across bus 34 while PCI Express endpoint switch 22 brings the link down and retrains for a configuration associated with the detected threshold. Once the retrain is complete, visual information is communicated to graphics controller 20 with the bandwidth available from the new bus configuration. PCI Express bus 24 is configured to have different numbers of lanes activated and inactivated at each threshold so that power consumption is reduced when less lanes are needed to communicate information across the bus.

As an example, bus utilization thresholds are set at plural levels with each level associated with a different number of activated PCI Express bus lanes and an expected bandwidth demand range. With a desktop graphic presented on display 26, information handling system 10 is often in an idle state and minimal bandwidth is consumed across PCI Express bus 24, such as approximately 250 KB/s or less. At this minimal threshold and below, performance monitor 34 commands the bus controller, PCI Express endpoint switch 22 to activate only one lane for communication of visual information. With the presentation of additional information at display 26 from additional applications, such as a video player, performance registers 36 detect greater bus utilization, such as moderate bandwidth demand between substantially 250 KB/s and 2 GB/s, and performance monitor 34 commands activation of additional numbers of lanes, such as eight lanes. With presentation of high resolution images at display 26, performance registers 36 detect high bus utilization, such as high bandwidth demand greater than 2 GB/s, and performance monitor 34 commands activation of all sixteen lanes of PCI Express bus 24. Performance monitor 34 may use other factors to determine the number of active lanes. For instance, an application interface 40 detects initiation of a high bandwidth consuming application so that performance monitor 34 maintains an associated bandwidth level on bus 24 during operation of the application. In one embodiment, performance monitor maintains all lanes active during operation on external power and conserves power by selectively inactivating lanes only on internal power.

Figure 2:
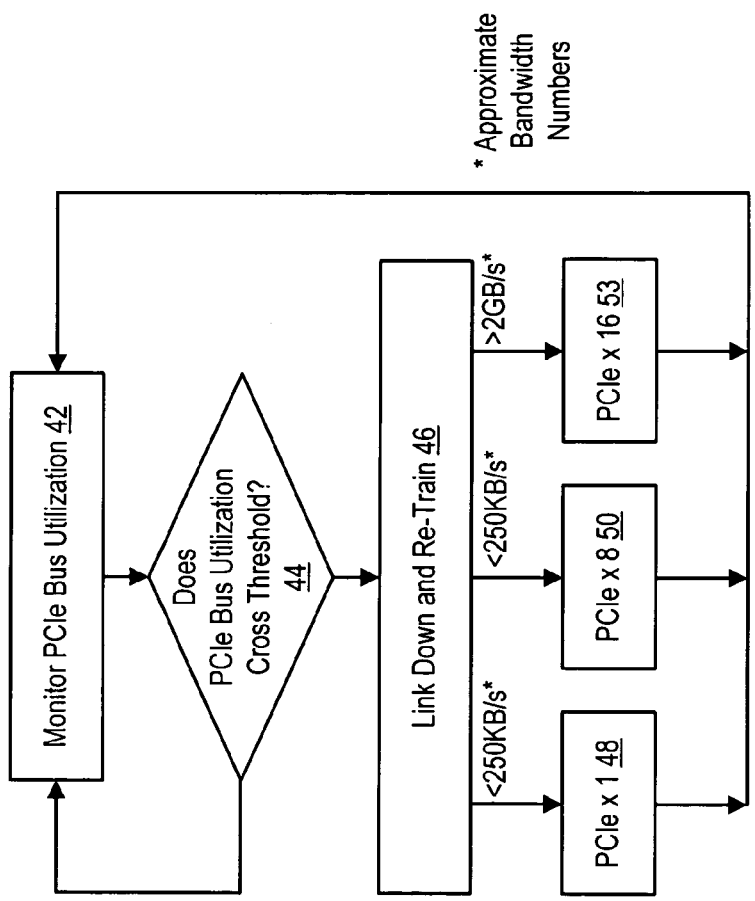
FIG. 2 depicts a flow diagram of a process for dynamic lane width adjustment based on PCI Express bus utilization.

Referring now to FIG. 2, a flow diagram depicts a process for dynamic lane width adjustment based on PCI Express bus utilization. The process begins at step 42 with monitoring of the PCI Express bus utilization, such as with registers interfaced with the bus that reside in the graphics controller, bus controller or other firmware. At step 44 a determination is made of whether the PCI Express bus utilization crosses a threshold relative to its current configuration. If the bus utilization remains within the thresholds associated with the current configuration, the process returns to step 42 for periodic monitoring of bus utilization. If the bus utilization crosses a threshold, the process continues to step 46 for configuration of the PCI Express bus with the number of lanes associated with the threshold. A link down and retrain process interrupts communication of information across the bus until completion of a re-train to have the number of lanes configured for communication of information that is associated with the determined threshold. For instance, if the threshold crossed is bus utilization of less than 250 KB/s, the process continues to step 48 to activate one lane of the bus and deactivated the remaining lanes, if the threshold is greater than 250 KB/s, the process continues to step 50 to activate eight lanes, and if the threshold is greater than 2 GB/s, the process continues to step 52 to activate all sixteen lanes of the PCI Express bus. In alternative embodiments, more or different thresholds may be used with, for example, the bus utilization of the thresholds associated with expected bus utilization for running desired applications.

Although the present invention has been described in detail, it should be understood that various changes, substitutions and alterations can be made hereto without departing from the spirit and scope of the invention as defined by the appended claims.

What is claimed is:

1. An information handling system comprising:
    plural processing components operable to run one or more applications, the applications generating visual information;
    a display operable to present the visual information as an image;
    a graphics controller interfaced with the display and operable to convert the visual information to a display format for presentation as the image at the display;
    a bus interfacing the processing components and the graphics controller, the bus operable to communicate the visual information from the processing components to the graphics controller over one or more of plural lanes; and
    a performance monitor interfaced with the bus and operable to adjust the number of the lanes used to communicate the information by measuring bus utilization, comparing the bus utilization with one or more predetermined thresholds and selectively activating or inactivating predetermined numbers of bus lanes associated with the thresholds based on the comparing.

2. The information handling system of claim 1 wherein the bus comprises a PCI Express bus having plural lanes.

3. The information handling system of claim 2 wherein the PCI Express bus has sixteen lanes.

4. The information handling system of claim 1 wherein the performance monitor comprises:
    performance registers operable to track communication across the bus; and
    an interrupt module operable to interrupt communication across the bus during a retrain for the adjusted number of lanes.

5. The information handling system of claim 4 wherein the performance registers and interrupt module reside in the graphics controller.

6. The information handling system of claim 1 further comprising:
    an internal power source operable to power the processing components; and
    an external power source operable to power the processing components and charge the internal power source;
    wherein the performance monitor is enabled if power is provided by the internal power source and disabled if power is provided by the external power source.

7. The information handling system of claim 1 wherein the bus utilization thresholds comprise:
    a low bandwidth threshold of approximately 250 KB/s or less and associated with a one lane bus activation;
    a moderate bandwidth threshold of approximately 250 KB/s to 2 GB/s and associated with an eight lane bus activation; and
    a high bandwidth threshold of approximately 2 GB/s or greater and associated with a sixteen lane bus activation.

8. The information handling system of claim 1 further comprising an application interface operable to set predetermined lane activations associated with operation of predetermined applications.

9. A method for communicating information across a bus having plural lane widths, the method comprising:
    monitoring bus utilization;
    detecting a bus utilization associated with a predetermined of plural thresholds; and
    adjusting the number of bus lanes to a number associated with the detected bus utilization.

10. The method of claim 9 wherein the bus comprises a PCI Express bus.

11. The method of claim 10 wherein detecting a bus utilization comprises detecting communication of substantially 2 GB/s of information or greater and adjusting the number of bus lanes comprises retraining the bus to utilize 16 lanes of width.

12. The method of claim 10 wherein detecting a bus utilization comprises detecting communication of substantially between 250 KB/s and 2 GB/s of information and adjusting the number of bus lanes comprises retraining the bus to utilize 8 lanes of width.

13. The method of claim 10 wherein detecting a bus utilization comprises detecting communication of substantially 250 KB/s or less of information and adjusting the number of bus lanes comprises retraining the bus to utilize 1 lane of width.

14. The method of claim 9 further comprising:
    adjusting to use all of the bus lanes if power is supplied from an external power source; and
    adjusting the number of bus lanes to a number associated with the detected bus utilization if power is supplied from an internal power source.

15. The method of claim 9 wherein adjusting further comprises:
    interrupting communication of information across the bus;
    retraining the bus for the predetermined number of bus lanes; and
    allowing communication of information across the bus when the retraining is complete.

16. The method of claim 9 further comprising communication visual information across the bus to support the presentation of images on a display.

17. A system for communicating information between processing components of an information handling system, the system comprising:
    a bus having plural lanes;
    a bus controller operable to selectively activate variable numbers of the plural lanes; and
    a performance monitor interfaced with the bus and the bus controller, the performance monitor operable to determine the bus utilization and to adjust the number of lanes activated to a number associated with the determined bus utilization.

18. The system of claim 17 wherein the bus comprises a PCI Express bus and the bus controller comprises a PCI Express endpoint switch.

19. The system of claim 17 wherein the plural lanes are sixteen lanes and the performance monitor adjusts between one, eight and sixteen active lanes.

20. The system of claim 17 wherein the performance monitor comprises:

one or more performance registers operable to determine the amount of information communicated across the bus; and an interrupt module operable to temporarily interrupt the communication of information across the bus during adjustment of the number of lanes.

* * * * *